United States Patent
Hillard et al.

(10) Patent No.: US 12,063,878 B2
(45) Date of Patent: Aug. 20, 2024

(54) LARGE SEALING LID WITH SLIDES AND LOCK

(71) Applicant: Deere & Company, Moline, IL (US)

(72) Inventors: Kirk P. Hillard, Davenport, IA (US); Derryn Pikesh, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 348 days.

(21) Appl. No.: 17/482,551

(22) Filed: Sep. 23, 2021

(65) Prior Publication Data

US 2023/0104651 A1   Apr. 6, 2023

(51) Int. Cl.
*A01C 15/00* (2006.01)
*A01C 23/00* (2006.01)

(52) U.S. Cl.
CPC .......... *A01C 15/005* (2013.01); *A01C 23/008* (2013.01)

(58) Field of Classification Search
CPC ... A01C 15/005; A01C 23/008; A01C 15/006; B60P 3/226; B65D 43/26; B65D 90/10; B65D 88/128; B65D 43/20
USPC ................. 220/562, 811, 812, 813, 814, 815
See application file for complete search history.

(56) References Cited

U.S. PATENT DOCUMENTS

| | | | | |
|---|---|---|---|---|
| 2,960,367 A | * | 11/1960 | Yodice | F16J 13/18 298/17 R |
| 3,961,723 A | * | 6/1976 | Eckel | B65D 43/14 220/812 |
| 10,322,658 B2 | | 6/2019 | Borkgren et al. | |
| 2006/0213909 A1 | * | 9/2006 | Epp | B65D 90/10 220/366.1 |
| 2017/0073155 A1 | * | 3/2017 | Borkgren | B65D 25/28 |

FOREIGN PATENT DOCUMENTS

KR   20000020255 U   11/2000

OTHER PUBLICATIONS

Extended European Search Report and Written Opinion issued in European Patent Application No. 22194141.2, dated Feb. 20, 2023, in 5 pages.

* cited by examiner

*Primary Examiner* — Nathan J Jenness
*Assistant Examiner* — Laura E. Parker
(74) *Attorney, Agent, or Firm* — Taft Stettinius & Hollister LLP; Stephen F. Rost

(57) ABSTRACT

A closure assembly includes a tank opening flange that surrounds a tank opening of a supply tank and a tank lid that covers the tank opening. The tank lid is operable between open and closed positions. A compression seal is attached to an underside of the tank lid and is disposed between the tank opening flange and the tank lid when the tank lid is in the closed position. A pair of guides are attached to opposite sides of the tank opening flange wherein each of the pair of guides defines a track opening to receive a plurality of sliding mechanisms attached to the tank lid. The track opening guides the sliding mechanisms and the tank lid around the tank opening flange such that the compression seal does not engage the tank opening flange when the tank lid is operated between the closed and open positions.

20 Claims, 15 Drawing Sheets

LARGE SEALING LID WITH SLIDES AND LOCK

FIELD OF THE DISCLOSURE

The present disclosure relates to closure mechanisms, and in particular to a sealing lid for openings in tanks of agricultural machines.

BACKGROUND OF THE DISCLOSURE

Agricultural machines often carry large supply tanks or containers for different types of materials. Some types of materials include liquid or dry materials, such as fertilizers, seeds, and other agricultural products. The supply tanks typically have large openings at their tops that are used to fill the tanks with the agricultural products. Generally, there are two types of lids that are typically used to seal these large openings. The first type of lid is a clamshell or clamping lid that pivots open from one side. One issue with the clamshell lid is that the lid does not slide away from the opening to allow for full access of the opening which hinders filling the tank with agricultural product. A second type of lid lifts vertically away from the track and then the lid slides horizontally away from the opening to allow for full access of the opening. As the second type of lid slides and lifts away from the track, a seal is exposed to the environment that is often filled with air pollutants from the agricultural products that are added to the tank when the second type of lid is opened. The second type of lid includes many complex components that operate to vertically lift the lid and then horizontally slide the lid rearwardly wherein these complex components often break with continued usage. Moreover, as the seal becomes filled with air pollutants the second type of lid cannot completely close or seal the large opening because the pollutants become trapped in the seal and block the lid from closing.

Therefore, further contributions in this area of technology are needed to increase efficiency, increase productivity, and increase the ease of operation of sealing lids for openings in tanks of agricultural machines. Therefore, there remains a significant need for the apparatuses, methods, and systems disclosed herein.

SUMMARY

According to one embodiment of the present disclosure, in an agricultural machine having a supply tank with a tank opening, a closure assembly comprising: a tank opening flange configured to surround the tank opening; a tank lid operable between an open position and a closed position, the tank lid while in the closed position configured to cover the tank opening, the tank lid while in the open position configured to uncover the tank opening, the tank lid having a first lid flange opposite a second lid flange; a clevis mechanism operably attached to both of the second lid flange and the tank opening flange to enable the tank lid to pivot about the tank opening flange; a plurality of sliding mechanisms attached to the tank lid; and a pair of guides attached to opposite sides of the tank opening flange, each of the pair of guides defines a track opening for receiving the plurality of sliding mechanisms such that the tank lid slides along the track openings of the pair of guides when the tank lid is operated between the open and closed positions.

In one example, further comprising: one or more compression seals attached to an underside of the tank lid, the one or more compression seals disposed between the tank opening flange and the tank lid when the tank lid is in the closed position.

In a second example, further comprising: a locking system configured to retain the tank lid in a locked position.

In a third example, wherein the locking system is configured to operably engage and lift the tank lid away from the tank opening.

In a fourth example, wherein the clevis mechanism includes a clevis pin operably engaged with a clevis opening in the tank opening flange such that the clevis pin rotates in the clevis opening.

In a fifth example, wherein the clevis opening is configured such that the clevis pin exits the clevis opening when the tank lid is in the open position.

According to another embodiment of the present disclosure, in an agricultural machine having a supply tank with a tank opening, a closure assembly comprising: a tank opening flange configured to surround the tank opening; a tank lid operable between an open position and a closed position, the tank lid while in the closed position configured to cover the tank opening, the tank lid while in the open position configured to expose the tank opening; a pivotable mechanism operably attached to both of the tank lid and the tank opening flange to enable the tank lid to pivot about the tank opening flange; a plurality of sliding mechanisms attached to the tank lid; and a pair of guides attached to opposite sides of the tank opening flange, each of the pair of guides defines a track opening configured to receive the plurality of sliding mechanisms such that the tank lid slides along the track openings of the pair of guides when the tank lid is operated between the open and closed positions.

In one example of this embodiment, further comprising: one or more compression seals attached to an underside of the tank lid, the one or more compression seals disposed between the tank opening flange and the tank lid when the tank lid is in the closed position.

In a second example, wherein the pivotable mechanism includes a clevis pin operably engaged with a clevis opening in the tank opening flange such that the clevis pin rotates in the clevis opening.

In a third example, wherein the sliding mechanisms include rollers that move along the track openings to a climax portion of the track openings such that the tank lid is in a raised position and the clevis pin is released from the clevis opening.

In a fourth example, wherein at least one of the rollers in the climax portion of the track opening includes at least one of the compression seals having cleared the tank opening flange.

In a fifth example, wherein the sliding mechanisms include rollers that move along the track openings to an end opening such that the tank lid is lower than a top of the tank opening flange and the tank opening is uncovered when the tank lid is in the open position.

In a sixth example, further comprising: a locking system configured to retain the tank lid in a locked position.

According to another embodiment of the present disclosure, in an agricultural machine having a supply tank with a tank opening, a closure assembly comprising: a tank opening flange configured to surround the tank opening; a tank lid operable between an open position and a closed position, the tank lid while in the closed position configured to cover the tank opening, the tank lid while in the open position configured to uncover the tank opening; one or more compression seals attached to an underside of the tank lid, the one or more compression seals disposed between the tank opening flange and the tank lid when the tank lid is in the closed position; a plurality of sliding mechanisms attached to the tank lid; and a pair of guides attached to opposite sides of the tank opening flange, each of the pair of guides defines a track opening configured to receive the plurality of sliding mechanisms, the track opening configured to guide the plurality of sliding mechanisms and the tank lid around the tank opening flange.

In one example, further comprising: a pivotable mechanism operably attached to both of the tank lid and the tank opening flange to enable the tank lid to pivot about the tank opening flange.

In a second example, wherein the pivotable mechanism includes a clevis pin operably engaged with a clevis opening in the tank opening flange such that the clevis pin rotates in the clevis opening.

In a third example, wherein the sliding mechanisms include rollers that move along the track openings to a climax portion of the track openings such that the tank lid is in a raised position and the clevis pin is released from the clevis opening.

In a fourth example, wherein at least one of the rollers in the climax portion of the track opening includes at least one of the compression seals having cleared the tank opening flange.

In a fifth example, wherein the sliding mechanisms include rollers that move along the track openings to an end opening such that the tank lid is lower than a top of the tank opening flange and the tank opening is uncovered when the tank lid is in the open position.

In a sixth example, further comprising: a locking system configured to retain the tank lid in a locked position, the locking system is configured to operably engage and lift the tank lid away from the tank opening.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Some of the benefits of the present disclosure include reducing the number of components and simplifying closure assemblies on tank openings of pressurized supply tanks. The unique closure assemblies are configured to block dirt and debris from reaching any of the lid seals in the closure assemblies. The closure assemblies are arranged at foot level to the operator such that the operator can easily reach the opening and closing movements of a large heavy tank lid of the closure assemblies. The tank lid contains one or more seals on the underside, and when the tank lid is in the closed position the one or more seals rest on one or more tank opening flanges to provide a pressurized seal. In any position of movement of the tank lid from open to close or close to open positions, the one or more seals on the underside of the tank lid are not damaged when opening and closing the tank lid.

Figure 1:
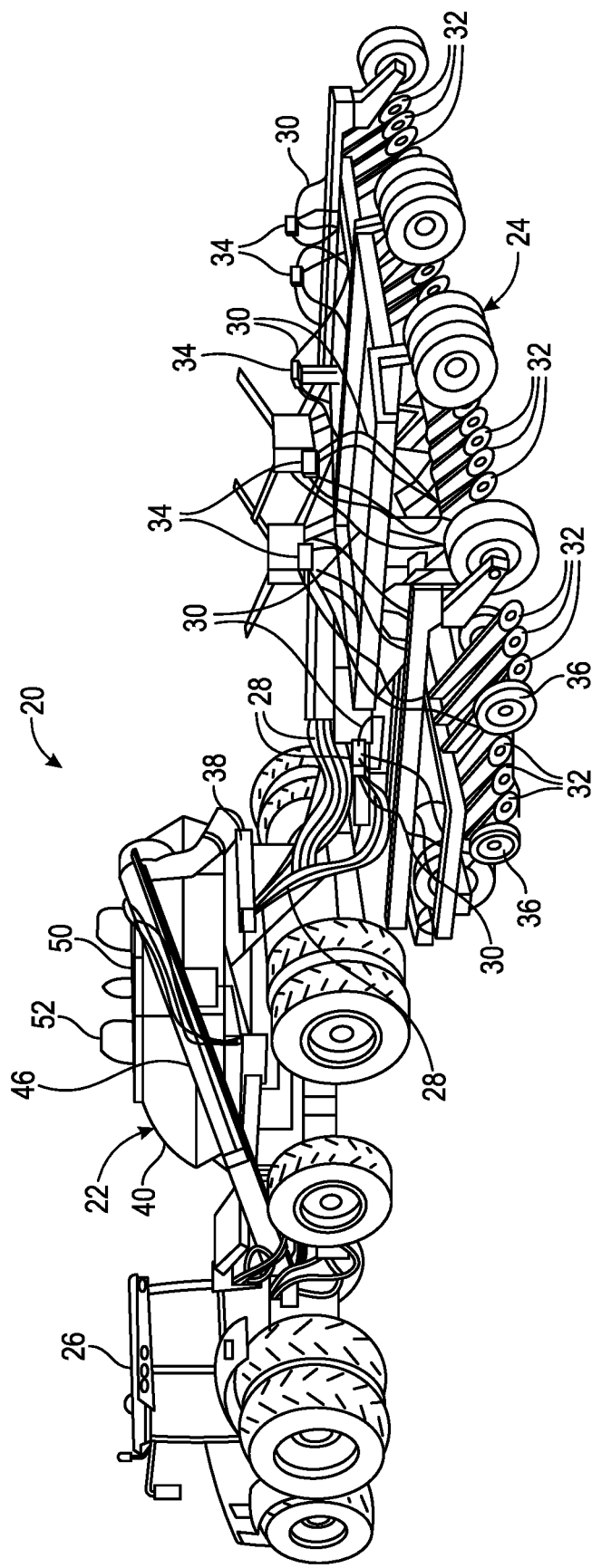
FIG. 1 is a perspective view of one embodiment of an air commodity dispersal (ACD) system including an ACD cart.

Referring now to FIG. 1, one embodiment of an air commodity dispersal ("ACD") ACD system 20, including an ACD cart 22 and a seeding machine 24, is illustrated. It is contemplated that other embodiments of the ACD system 20 may be utilized with the present disclosure. During operation, the ACD system 20 is pulled by a tractor 26 or otherwise moved across a field to distribute one or more agricultural commodities, such as seeds and fertilizer, held within the ACD cart 22. The agricultural commodities are carried by pressurized airstreams from the ACD cart 22 to the seeding machine 24, which then deposits or plants the commodities in the soil over which the ACD system 20 travels. A network of air conduits or plumbing lines 28, 30 conduct the commodity-entrained airstreams to a number of deposition tubes 32, which are arranged in different row units laterally spaced across the seeding machine 24. Additionally, a relatively small number of main air lines 28 may conduct the commodity-entrained airstreams from the ACD cart 22 to a number of distribution towers 34 mounted to the seeding machine 24 at various locations. The distribution towers 34 may then divide the airstreams amongst a larger number of secondary air lines 30, which then convey the commodity to the deposition tubes 32 for planting or deposition within the ground. The row units of the seeding machine 24 may also include various ground-engaging tools 36, which assist in the commodity deposition process by, for example, opening furrows, packing soil, and closing furrows over the newly-deposited commodities.

Figure 2:
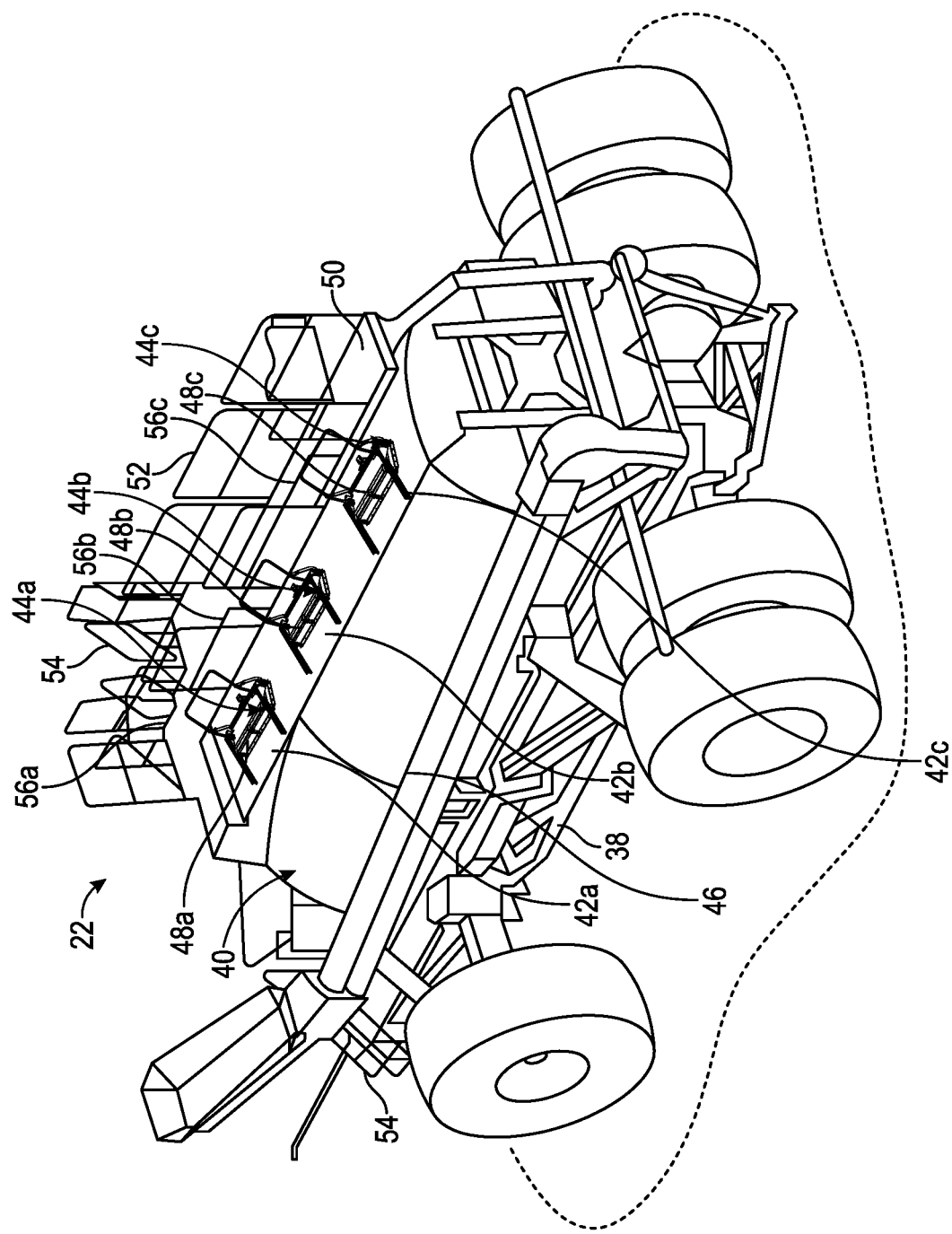
FIG. 2 is a perspective view of the ACD cart shown in FIG. 1 illustrating a number of closure assemblies installed around the openings of a pressurized supply tank.

Turning to FIG. 2, one embodiment of the ACD cart 22 is illustrated. Other embodiments of the ACD cart 22 may be utilized with the present disclosure. The ACD cart 22 includes a wheeled chassis or frame 38 on which one or more pressurized supply tanks are mounted, such as pressurized supply tank 40. The pressurized supply tank 40 may have multiple internally-partitioned compartments or "commodity chambers" each suitable for holding one or more types of agricultural commodities. A number of tank openings 42 are provided in pressurized supply tank 40 and each provide physical access to a corresponding commodity chamber within tank 40. Three such tank openings 42*a-c* are visible in FIG. 2 and spaced along the topside of pressurized supply tank 40. In further embodiments, the ACD cart 22 may include fewer or a greater number of the tank openings 42, which may provide access to any number of compartments or chambers contained within the pressurized supply tank 40. The tank openings 42 are often produced to be relatively large to permit commodities to be spread about the commodity chambers in a substantially even or distributed manner during filling. The tank openings 42 may vary size in conjunction with their corresponding commodity chambers, which may likewise vary in size depending upon the particular volume of commodity each chamber is intended to hold. As shown in FIGS. 1 and 2, the ACD cart 22 may be equipped with movable conveyor arm 46 to facilitate filling of the commodity chambers corresponding to the tank openings 42*a-c*.

Closure assemblies 44*a-c* are installed over the tank openings 42*a-c*, respectively. The closure assemblies 44 *a-c* include tank lids 48*a-c*, which are movable between closed and open positions. In the closed position, the tank lids 48*a-c* sealingly cover their respective tank openings 42*a-c*. The tank lids 48*a-c* are positioned along an elongated platform 50 extending above and along the length of the pressurized supply tank 40. The platform 50 is surrounded by a railing 52 and accessible utilizing a stairway 54 located adjacent the forward end of pressurized supply tank 40. The closure assemblies 44*a-c* further include handles 56*a-c*, respectively, which project upwardly from the tank lids 48*a-c* to allow an operator to move the lids 48*a-c* between their open and closed positions while standing on the platform 50. Openings or gateways are provided in the railing 52 to provide access to the handles 56*a-c*.

The handle 56*a* will be described next however the handles 56*b-c* are similar to handle 56*a*. The handle 56*a* includes a pair of front linkages 57*a* that are operably connected to tank opening flanges 58*a-b*. The handle 56*a* includes a pair of hinged connections 69*a* that operably connect the handle 56*a* to the tank lid 48*a*. The handle 56*a* is operable between a closed position to an open position to lift the tank lid 48*a* and move the tank lid 48*a* along the pair of guides 300*a-b*.

The tank openings 42*a-c* may have relatively large planform dimensions to permit commodities to be spread about the commodity chambers in a substantially even or distributed manner during initial filling. The tank lids 48*a-c* are thus likewise imparted with relatively large planform dimensions equivalent to or greater than the corresponding dimensions of their respective tank openings 42*a-c*. During operation of the ACD cart 22, the commodity chambers are pressurized in conjunction with generation of the pressurized airstreams in which metered amounts of the commodities are entrained. The internal pressures created within the commodity chambers is typically about 2 pounds per square inch (about 14 kilopascal). Significant pressure loading forces may still be exerted on the interior of the tank lids 48*a-c* by the pressurized air within the commodity chambers, due to the relatively large surfaces of the tank lids 48*a-c* exposed to the elevated internal forces.

FIGS. 3-12 are detailed views of the closure assembly 44*a* illustrating the tank lid 48*a* in open and closed positions. As the closure assembly 44*a* is similar to the closure assemblies 44*b* and 44*c* shown in FIG. 2, the following description is equally applicable thereto. The closure assembly 44*b* includes a first pair of tank opening flanges 58*a-b* that extend to and connect with a second pair of tank opening flanges 58*c-d* wherein the first and second pair of tank opening flanges 58*a-d* extend around the periphery of the tank opening 42*a*.

The first opening flange 58*c* of the second pair of tank opening flanges 58*c-d* is configured to receive a locking system 100 thereon. The first opening flange 58*c* includes a pair of extension legs 71*a* that are separated a distance from each other. Each of the extensions legs 71*a* includes one or more mounting holes 73*a* to receive cross bars, fasteners, bolts, or other components from the locking system 100 to mount the locking system 100 to the first opening flange 58*c*.

Figure 10:
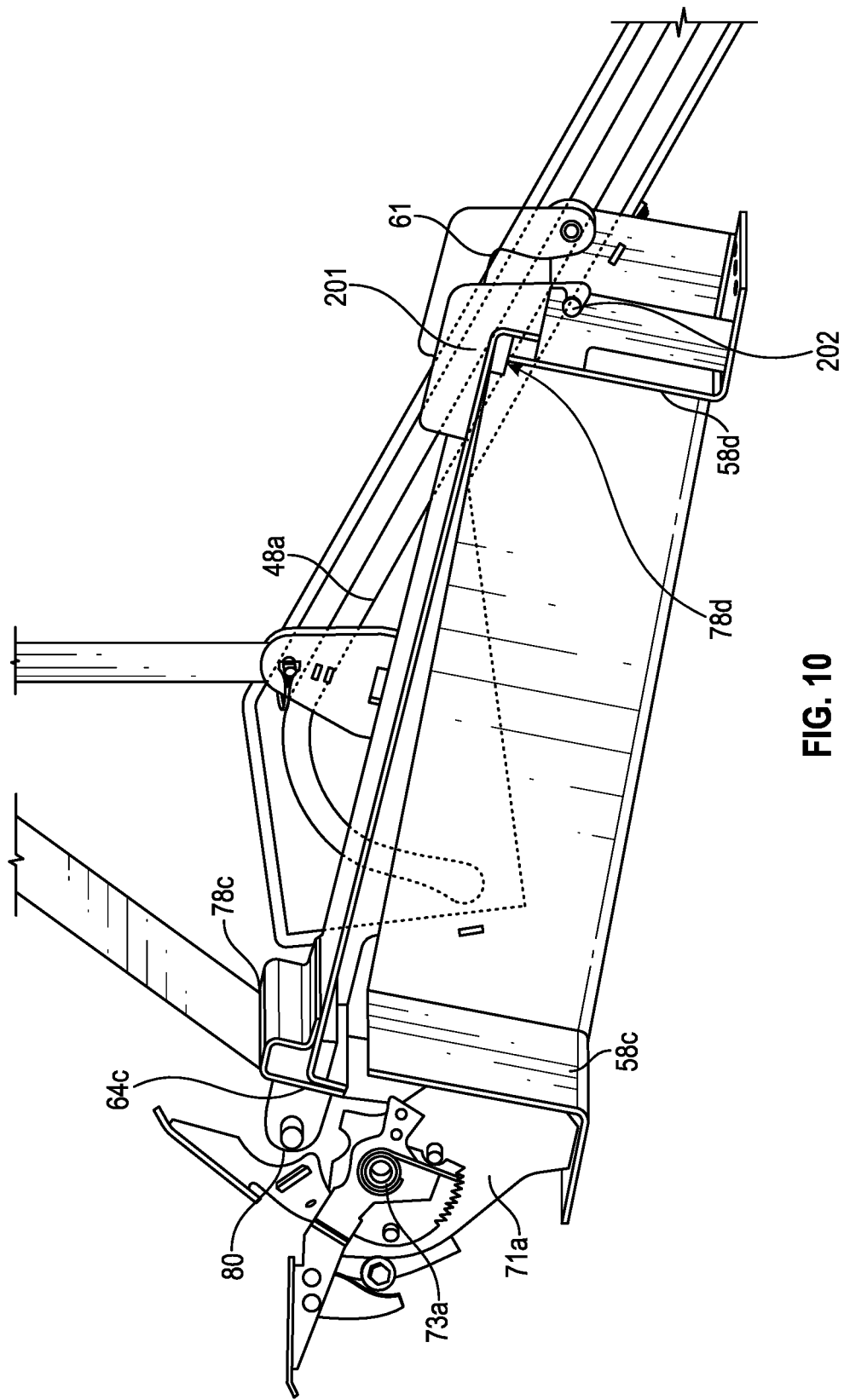
FIG. 10 is a cross-sectional view of the closure assembly of FIG. 2 in a partially open position.
Figure 11:
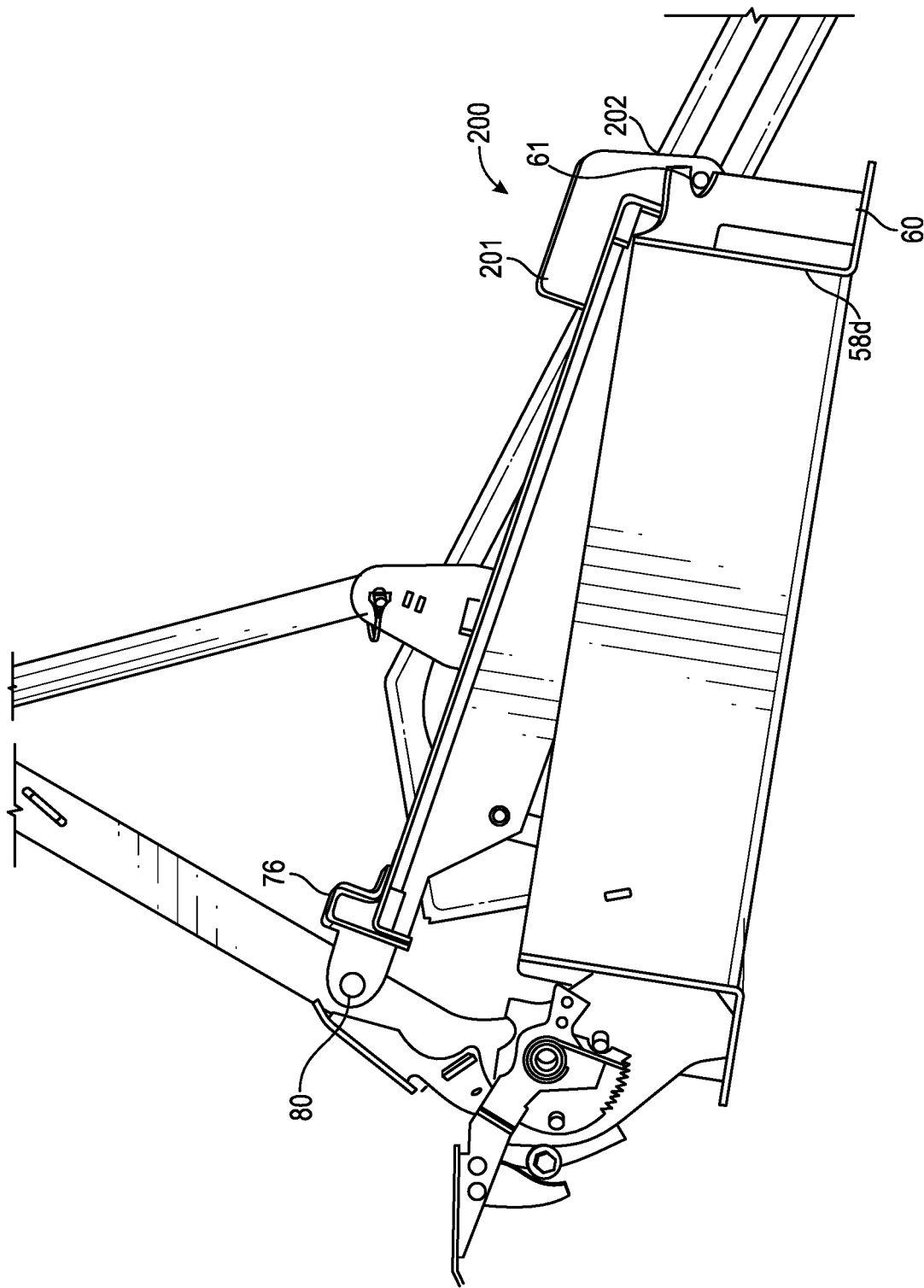
FIG. 11 is a cross-sectional view of the closure assembly of FIG. 2 in a raised position.
Figure 12:
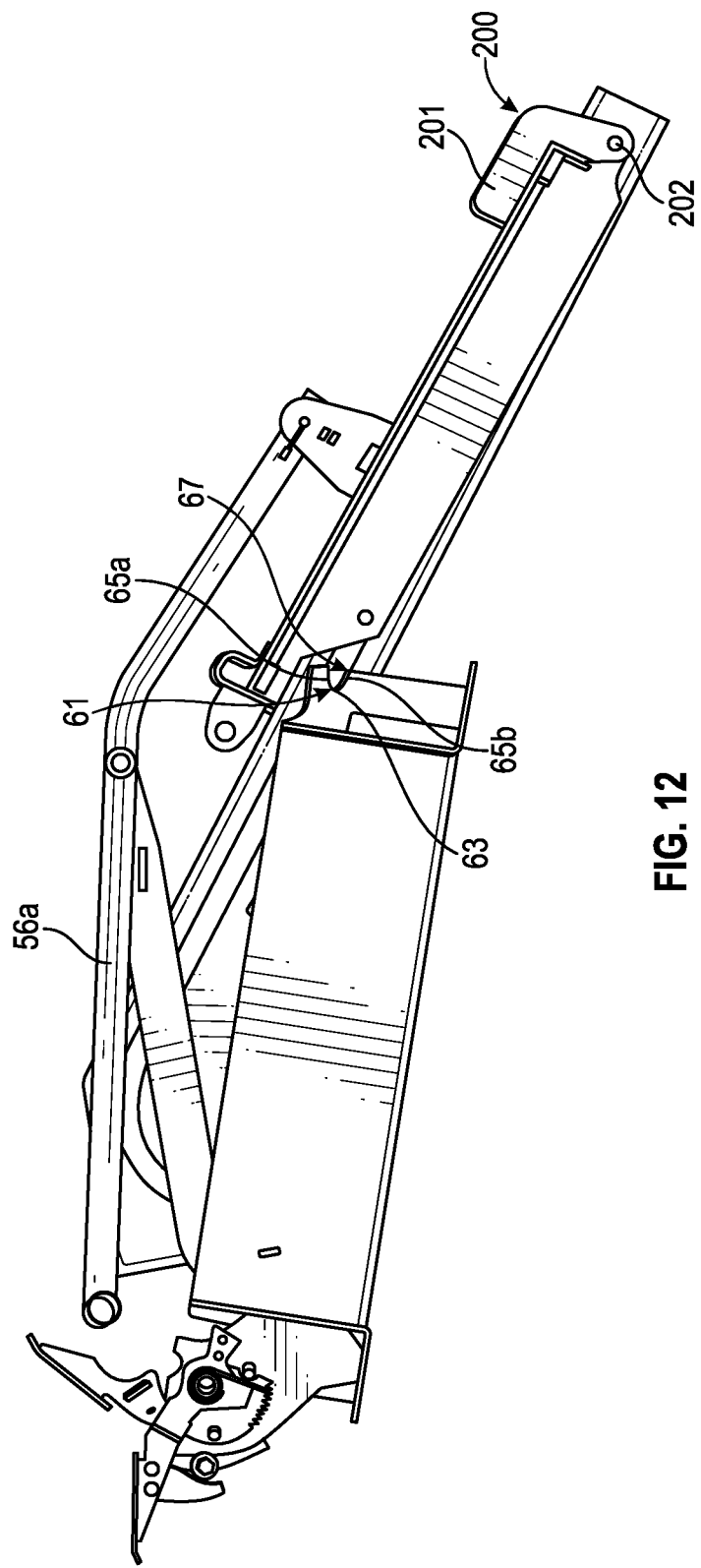
FIG. 12 is a side view of the closure assembly of FIG. 2 in the open position.

The second opening flange 58*d* of the second pair of tank opening flanges 58*c-d* is configured to engage a clevis mechanism 200 that extends from the tank lid 48*a*. The clevis mechanism 200 includes a clevis leg 201 having a generally "L" shape with a horizontal portion attached to the cover 62 of the tank lid 48*a*, and the clevis leg 201 has a vertical portion the extends vertically downwardly to a clevis pin 202 attached thereto. The second opening flange 58*d* includes a leg 60 that includes a clevis opening 61 sized to receive the clevis pin 202 from the clevis leg 201. The clevis leg 201 is configured and sized to align the clevis pin 202 in the clevis opening 61 when the tank lid 48*a* is in the closed position. The clevis opening 61 is configured to enable rotation of the clevis pin 202 when the tank lid 48*a* is in a partially open position as illustrated in FIG. 10. The clevis opening 61 is configured to enable the clevis pin 202 to move away from the clevis opening 61 and begin exiting the clevis opening 61 when the tank lid 48*a* is in a raised position as illustrated in FIG. 11. The clevis opening 61 is configured to enable the clevis pin 202 to fully exit the clevis opening 61 when the tank lid 48*a* is in the open position as illustrated in FIG. 12. The clevis opening 61 has a semi-circular portion 63 that extends to a first and a second clevis ramp 65*a-b*. The second clevis ramp 65*b* also forms a lip 67 upon which the clevis pin 202 may engage when the tank lid 48*a* is moved from the fully open position to the closed position. The clevis pin 202 may not engage the lip 67 but instead enter the clevis opening 61 thereby avoiding the lip 67. The opening and closing of the tank lid 48*a* is described in more detail below.

The tank lid 48*a* includes a cover 62 that is sized to cover or enclose the tank opening 42*a* formed by the first and second pair of tank opening flanges 58*a-d*. The cover 62 is generally rectangular in shape, however in other embodiments the cover 62 may be shaped differently. The tank lid 48*a* includes a first pair of lid flanges 64*a-b* that extend to and connect with a second pair of lid flanges 64*c-d* wherein the first and second pair of lid flanges 64*a-d* extend around and exteriorly to the first and second pair of tank opening flanges 58*a-d* when the tank lid 48*a* is in a closed position. The first and second pair of lid flanges 64*a-d* also extend vertically downwardly from the cover 62 along their corresponding first and second pair of tank opening flanges 58a-d when the tank lid 48a is in a closed position.

In the illustrated embodiment, the tank lid 48a also includes a locking rail 76 mounted on the cover 62 and above the lid flange 64a wherein the locking rail 76 is configured to receive one or more components from a locking system 100 as described in more detail below. In one form, the locking rail 76 includes a bar 80 that is configured to engage the locking system 100. In other embodiments, the bar 80 is configured differently but still operates to engage the locking system 100 as one of ordinary skill in the art would appreciate. The locking rail 76 generally extends in an upward direction away from the cover 62. The locking rail 76 has a rectangular cross-sectional shape but may be shaped differently in other embodiments. Moreover, in other embodiments, the tank lid 48a may not include the locking rail 76 and instead the lid flange 64c is configured to engage the locking system 100.

The tank lid 48a includes a first pair of compression seals 78a-b (not illustrated) that are sized and attached to an underside 79 of the cover 62 along the first pair of lid flanges 64a-b. The tank lid 48a includes a second pair of compression seals 78c-d that are sized and attached to the underside 79 of the cover 62 along the second pair of lid flanges 64c-d. The compression seals 78a-d cooperate with the first and second pair of tank opening flanges 58a-d to produce a degree seal between the tank lid 48a and the tank opening 42a. The compression seals 78a-d may be integrally formed as a single (e.g., molded) piece, which forms a complete rectangle or ring having a planform shape generally conforming to the shape of the tank lid 48a. Alternatively, the compression seals 78a-d may be produced as discrete pieces or seals, which are separately affixed to the first and second pairs of lid flanges 64a-d, respectively. The compression seals 78a-d may be a cast urethane seal, or other materials, which is glued, bolted, or otherwise attached to the tank lid 48a. The compression seals 78a-d may be rectangular in cross-sectional shape or have other shapes, compositions, and may be attached to the tank lid 48a in other manners. Additionally, in further embodiments, multiple compression seals may be utilized.

The tank lid 48a also includes a pair of front rollers 90a-b and a pair of rear rollers 92a-b wherein the front and rear rollers 90a and 92a are attached to and located on the lid flange 64a and the front and rear rollers 90b and 92b are attached to and located on the lid flange 64b. The pairs of front and rear rollers 90a-b and 92a-b are configured to slide along a pair of guides 300a-b.

The closure assembly 44a also includes a pair of guides 300a-b wherein the guide 300a is attached to the tank opening flange 58a and the guide 300b is attached to the tank opening flange 58b. The guide 300a includes a track opening 302a and the guide 300b includes a track opening 302b. Track opening 302a is substantially identical to the track opening 302b therefore only track opening 302b will be described. Track opening 302b extends along a length of the guide 300b wherein the track opening 302b includes a first end opening 304b and a clearance window 314b that corresponds to the tank lid 48a being in the closed position. In the closed position, the front roller 90b rests in the first end opening 304b and the rear roller 92b rests in the clearance window 314b. The track opening 302b includes a second end opening 306b that corresponds to the tank lid 48a being in the open position. The track opening 302b includes an arc portion 308b that engages the first end opening 304b and generally forms an angle A relative to a vertical reference line. The angle A is typically between 0 and 45 degrees but can be larger than 45 degrees in other embodiments. The arc portion 308b may be curved or straight. The arc portion 308b has a length that corresponds to raising the tank lid 48a to the raised position such that the compression seal 78d is decompressed as the tank lid 48a lifts away from the tank opening flange 58d. The track opening 302b includes a climax portion 310b that is tangent along the arc portion 308b and is the highest peak that the front roller 90b will travel along the track opening 302b. When the front roller 90b is in the climax portion 310b, the compression seal 78d has cleared the tank opening flange 58d such that the compression seal 78d is not damaged as the tank lid 48a slides up and over the tank opening flange 58d. The track opening 302b includes a runner portion 312b that extends from the climax portion 310b to the second end opening 306b. The runner portion 312b forms an angle B relative to a horizontal reference line wherein the angle B is typically between 10 to 45 degrees but may be larger in other embodiments. The runner portion 312b has a length that substantially corresponds to the length of tank opening flange 58b such that when the tank lid 48a is in the open position the agricultural commodity can be placed in the tank opening 42a without touching the tank lid 48a and the tank lid 48a does not block any portion of the tank opening 42a.

The operation from an open to closed positioned of the closure assemblies 44a-c will now be described with reference to the closure assembly 44a as closure assemblies 44b-c operate in a similar fashion. The operator uses the handle 56a to move the tank lid 48a from the open to closed positions, and from the closed to open positions. From the closed position illustrated in FIG. 9 to a partially open position as illustrated in FIG. 10, the operator engages the locking system 100 to release the tank lid 48a such that the compression seal 78c and the compression seal 78d are decompressed. Also illustrated in FIG. 10 is the tank lid 48a and the lid flange 64c that is raised above the tank opening flange 58c as the clevis pin 202 pivots or rotates in the clevis opening 61 such that the tank lid 48a is now propped open a few degrees from the closed position. As the front rollers 90a-b move along the arc portions 308a-b to the climax portions 310a-b and the tank lid 48a is in the raised position illustrated in FIG. 11, the clevis pin 202 is released from the clevis opening 61. The tank lid 48a follows an arc motion along the arc portions 308a-b until the front rollers 90a-b reach the climax portions 310a-b such that the tank lid 48a is raised partially above the tank opening flange 58b. The compression seal 78d has rotated and cleared or moved past the tank opening flange 58d. As the front rollers 90a-b continue to move from the climax portions 310a-b along the length of the runner portions 312a-b, the tank lid 48a follows a linear downward motion to clear the tank opening 42a. As the front rollers 90a-b move along the runner portions 312a-b to the second end opening 306b, generally the tank lid 48a is lower than the top of the tank opening flanges 58a-d to allow clearance for filling the corresponding commodity chamber within tank 40 and visibility of filling from ground level. To move the tank lid 48a from the open position in FIG. 12 to the raised position in FIG. 11, i.e., to begin to partially close the tank lid 48a, the tank lid 48a slides along the track openings 302a-b with the compression seal 78d raised above the tank opening flange 58d until the clevis pin 202 makes contact with the lip 67 on the second clevis ramp 65b and the compression seal 78d makes contact with the tank opening flange 58d. From the raised position in FIG. 11 to the partially open position in FIG. 10, the travel motion of the tank lid 48*a* changes to an arc motion as the front rollers 90*a-b* travel along the arc portions 308*a-b*. When the front rollers 90*a-b* reach the first end openings 304*a-b*, the tank lid 48*a* is in the closed position illustrated in FIG. 9 and the compression seal 78*c* engages the tank opening flange 58*c* and the remaining compression seals 78*a,b,d* engage their respective tank opening flange 58*a,b,d*. The operator engages the locking system 100 to lock the tank lid 48*a* into the closed position.

Referring now to FIGS. 9-12 and FIGS. 13-19, the locking system 100 will now be described with reference to the closure assembly 44*a*. The locking system 100 is one embodiment that can be used with the closure assembly 44*a*, however other forms of the locking systems can be used with the closure assembly 44*a*. The locking system 100 retains the tank lid 48*a* in a closed position until the locking system 100 is activated. Once the locking system 100 is activated, such as by an operator, the locking system 100 releases from the tank lid 48*a* and the locking system 100 engages the tank lid 48*a* to lift the tank lid 48*a* into a slightly open position as illustrated in FIG. 10. Thereafter the operator uses the handle 56*a* to move the tank lid 48*a* into the fully opened position.

Figure 9:
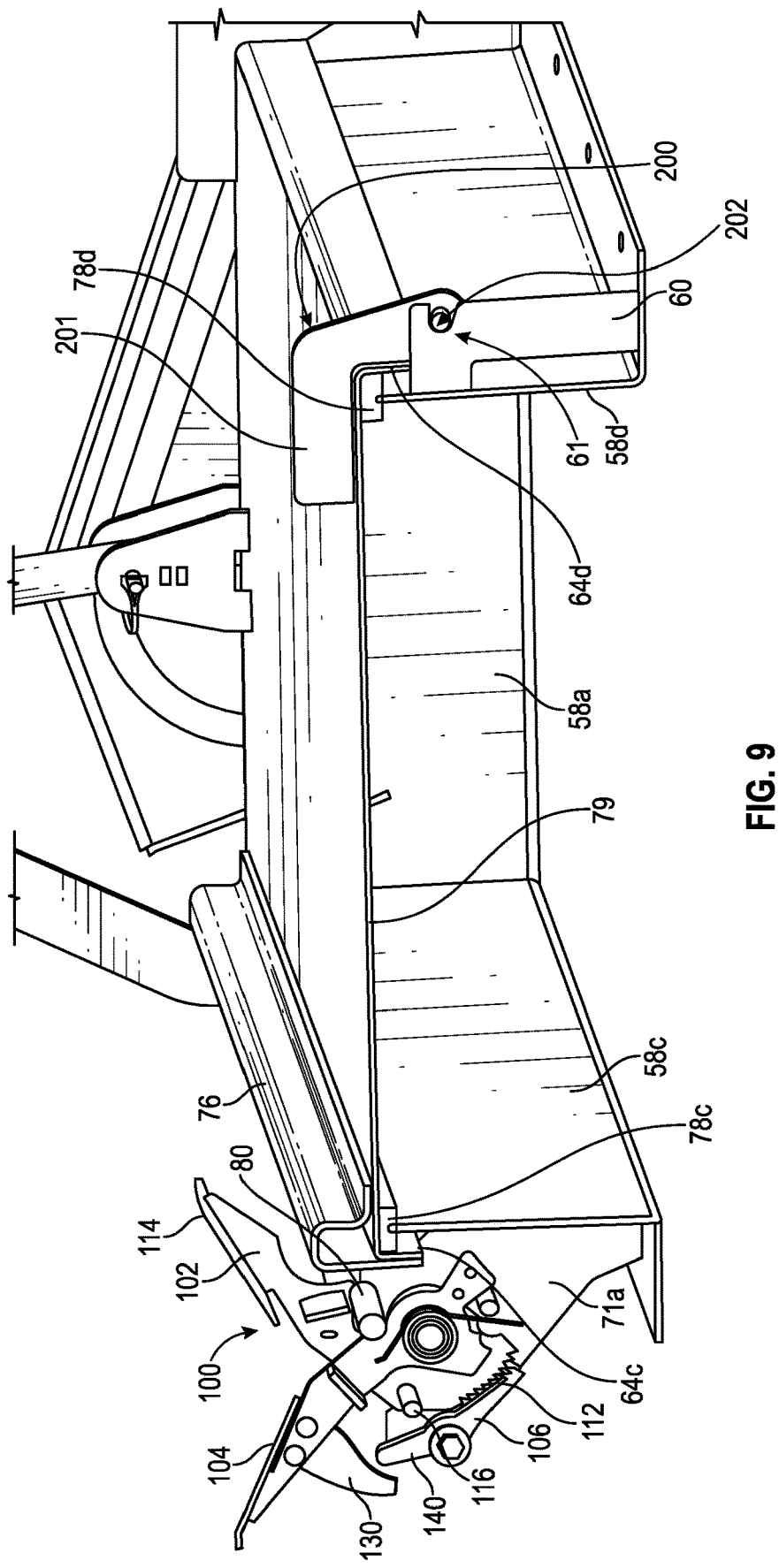
FIG. 9 is a cross-sectional view of the closure assembly of FIG. 2 in the closed position.
Figure 13:
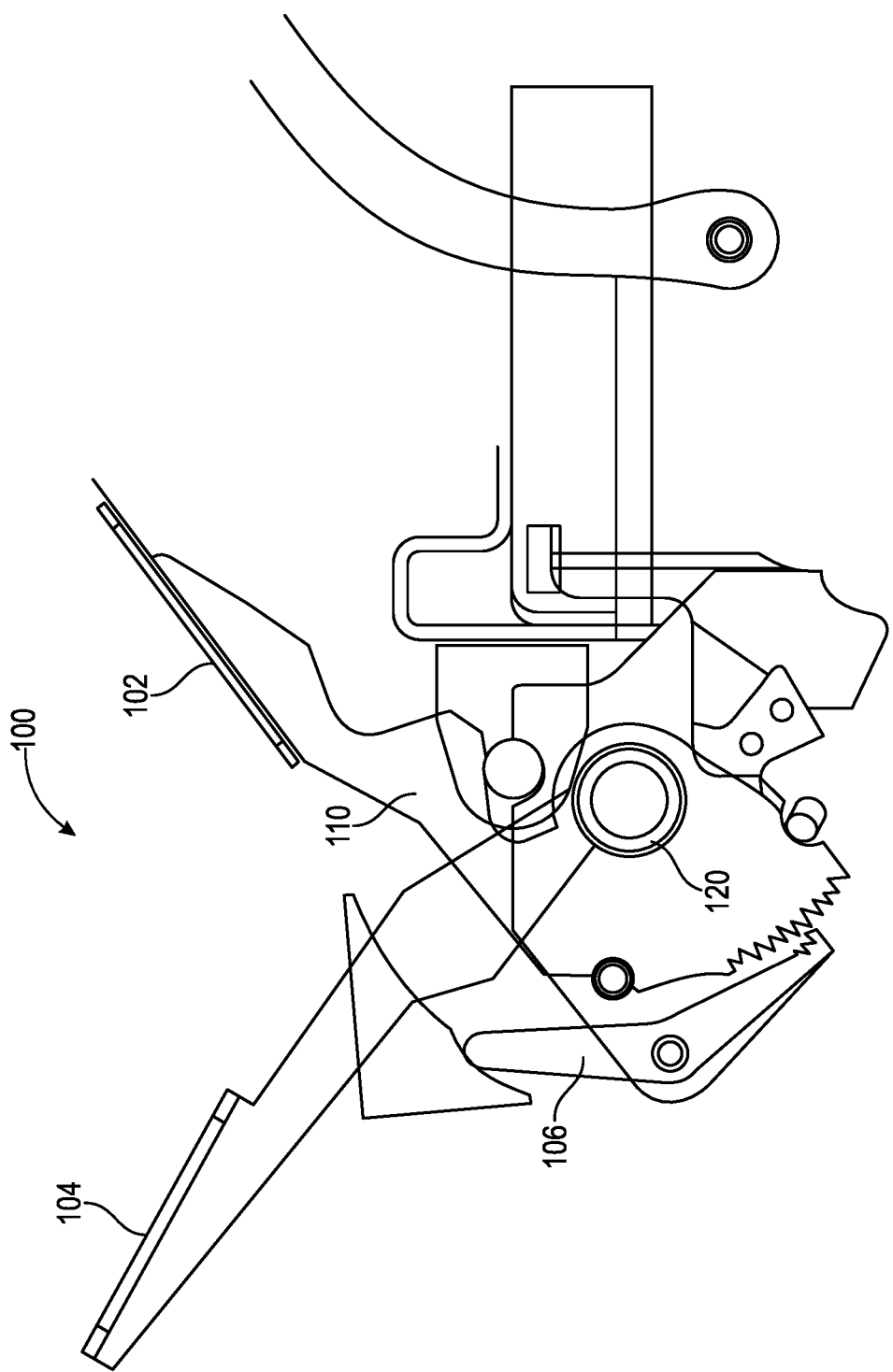
FIG. 13 is a side view of one embodiment of a locking system for use with the closure assembly of FIG. 2.

The locking system 100 includes a first foot pedal 102, a second foot pedal 104, and a locking pawl 106. The first foot pedal 102 includes a cam shape latch 110 that engages the bar 80 to lock the tank lid 48*a* in a closed position as illustrated in FIGS. 9 and 13. The first foot pedal 102 includes an engagement portion 112 to engage and retain the locking pawl 106 in the closed position. The engagement portion 112 includes one or more teeth 113 configured to engage the locking pawl 106. The first foot pedal 102 includes a foot engagement portion 114 that is shaped to receive an operator's foot thereon and operates as a lever to push the cam shape latch 110 into engagement with the bar 80 as the first foot pedal 102 rotates about a rotation axis or pivot 120 to lock the tank lid 48*a* closed. The first foot pedal 102 includes a bump stop 116 that spans between a first leg 122 and a second leg 124 of the first foot pedal 102.

The second foot pedal 104 includes an engagement portion 130 to engage the locking pawl 106 and maintain the locking pawl 106 in the closed position. The second foot pedal 104 includes a foot engagement portion 132 that is shaped to receive an operator's foot thereon. The second foot pedal 104 includes a pair of legs 134 that are configured to engage a cam 136 that extends from the extension legs 71*a* wherein the pair of legs 134 rotate to engage the cam 136 to stop the second foot pedal 104 from further rotation. The second foot pedal 104 includes a kicker portion 138 that engages the bump stop 116 of the first foot pedal 102. The second foot pedal rotates about the rotation axis or pivot 120.

The locking pawl 106 includes a release portion 140 opposite a locking portion 142 wherein the release portion 140 is separated from the locking portion 142 by a rotational axis 144 about which the locking pawl 106 rotates. In one form, the locking pawl 106 rotates from an angle of about 47 degrees to an angle of about 33.5 degrees for a net angle movement of about or 15 degrees. The release portion 140 is configured to engage the engagement portion 130. The locking portion 142 includes one or more teeth 146 to engage the one or more teeth 113 on the engagement portion 112 of the first foot pedal 102. The cam shape latch 110 along with the one or more teeth 113 help to keep the first foot pedal 102 in a home or closed position as the pressure in tank will apply a large force to the underside of the lid. The locking pawl 106 also provides a "click" giving the operator an indication that the locking pawl 106 is set. The locking pawl 106 is attached to the extension legs 71*a* at the rotational axis 144 with a bolt or other fastener 150 through one of the mounting holes 73*a*.

Figure 3:
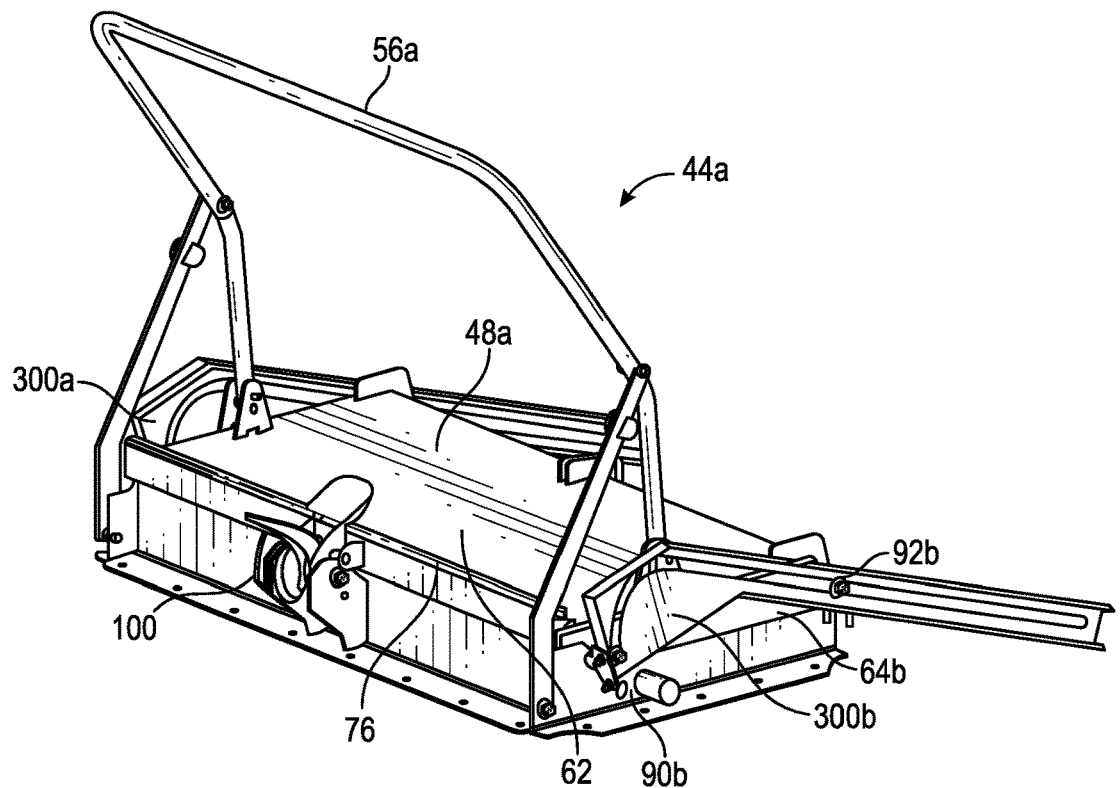
FIG. 3 is a top perspective view of one of the closure assemblies shown in FIG. 2 in a closed position.
Figure 4:
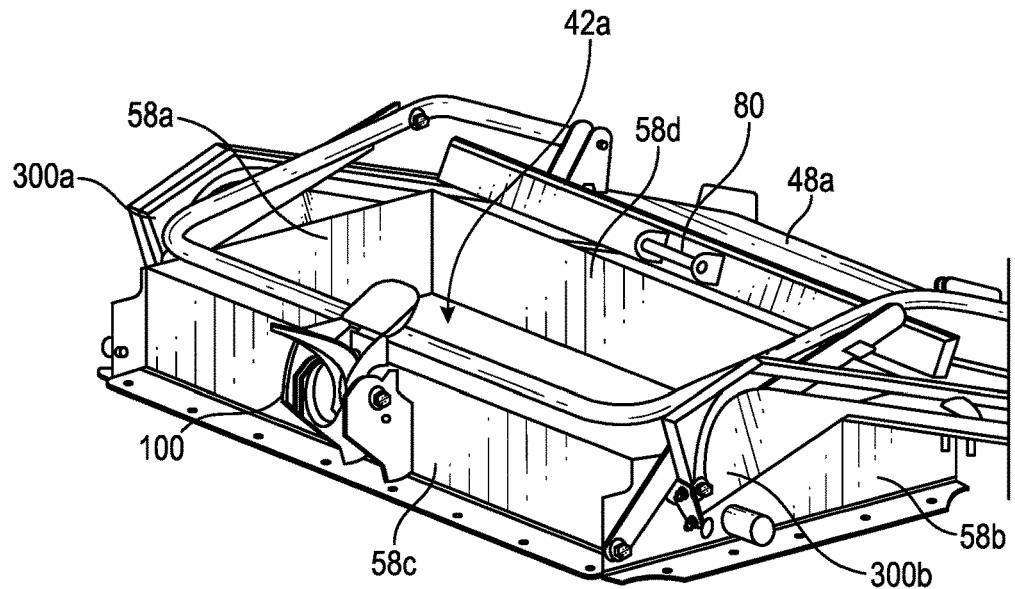
FIG. 4 is a top perspective view of the closure assembly of FIG. 2 in an open position.
Figure 5:
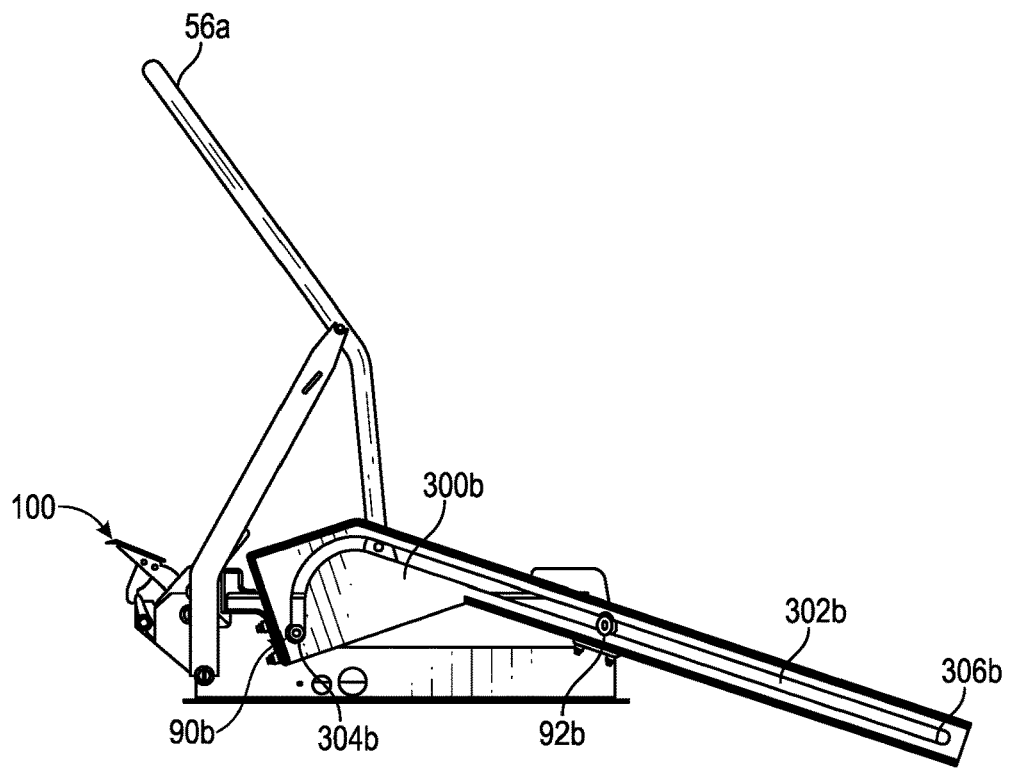
FIG. 5 is a side view of the closure assembly of FIG. 2 in the closed position.
Figure 6:
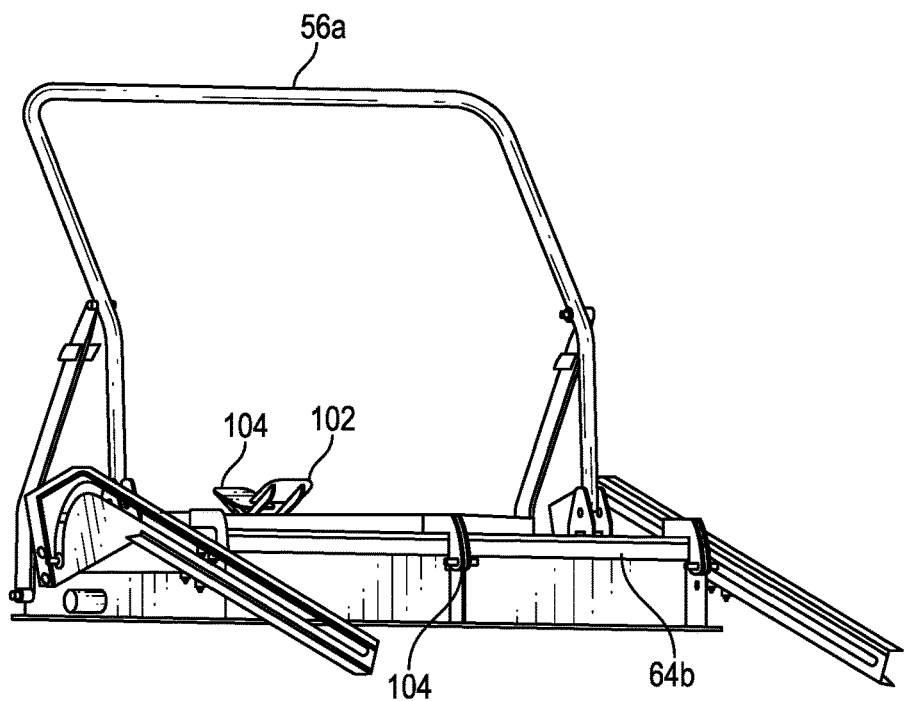
FIG. 6 is a rear view of the closure assembly of FIG. 2 in the closed position.
Figure 7:
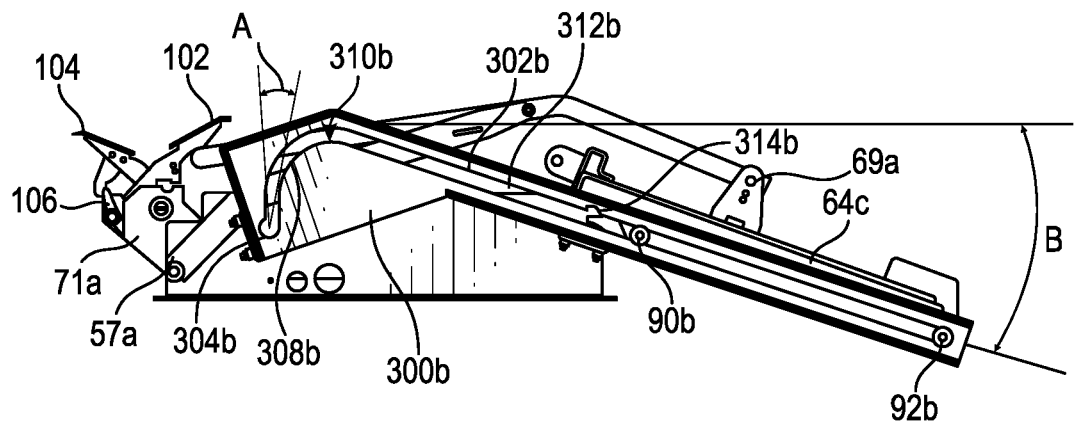
FIG. 7 is a side view of the closure assembly of FIG. 2 in the open position.
Figure 8:
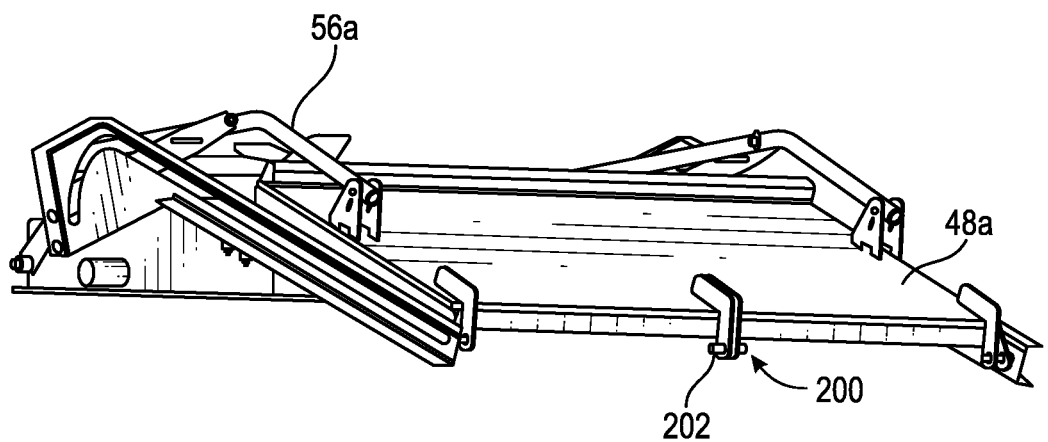
FIG. 8 is a rear view of the closure assembly of FIG. 2 in the open position.
Figure 17:
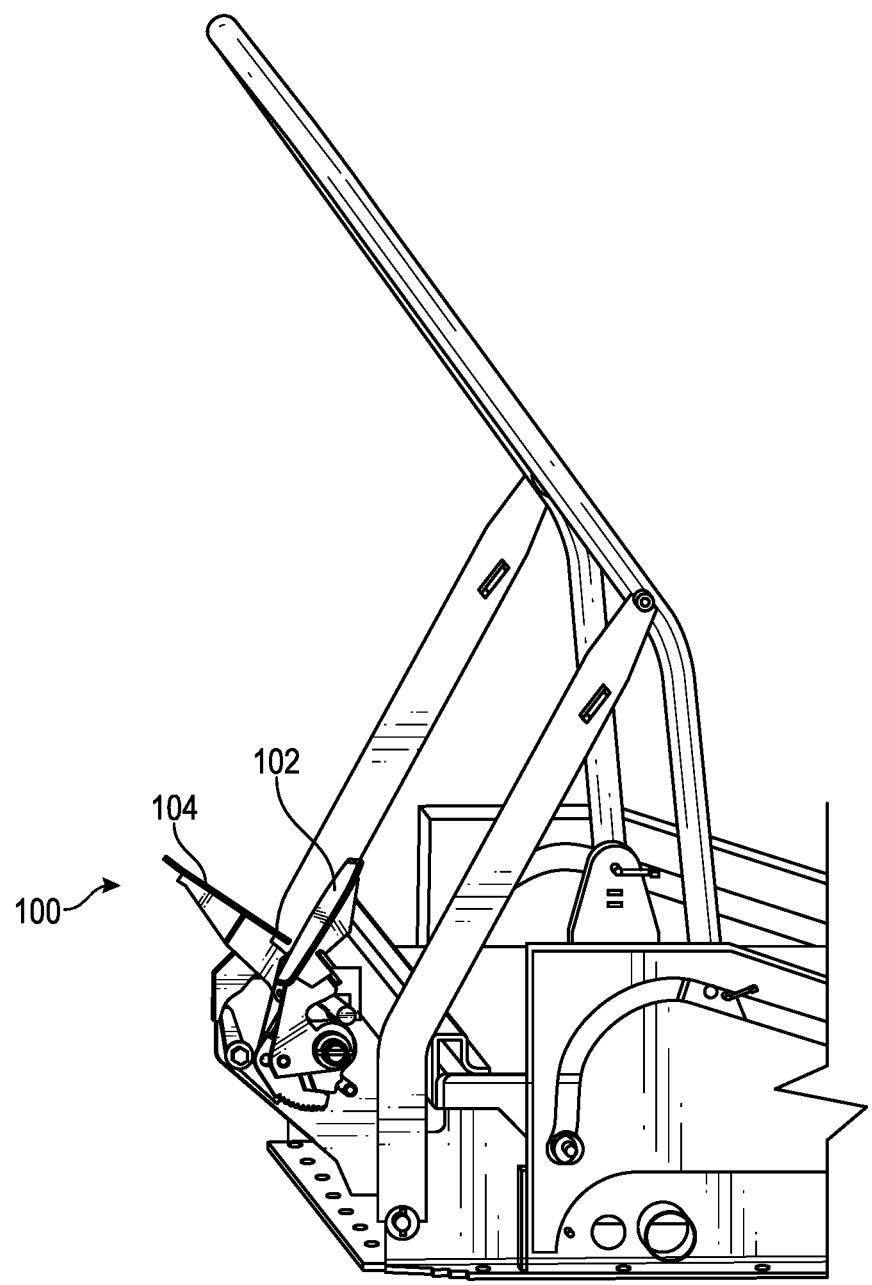
FIG. 17 is a top perspective view of the locking system of FIG. 13.
Figure 19:
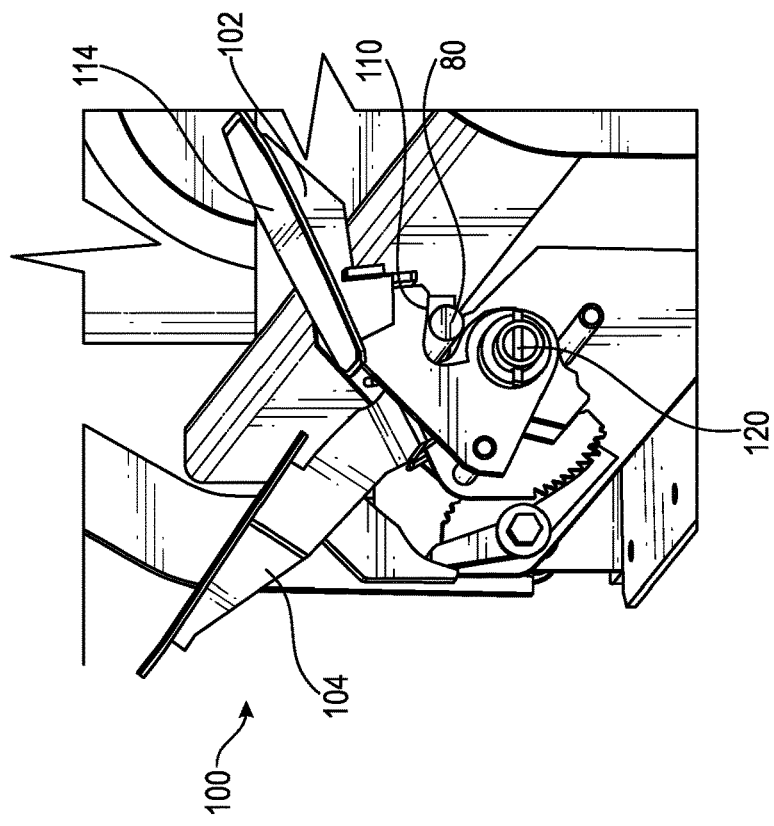
FIG. 19 is a top perspective view of the locking system of FIG. 13.
Figure 18:
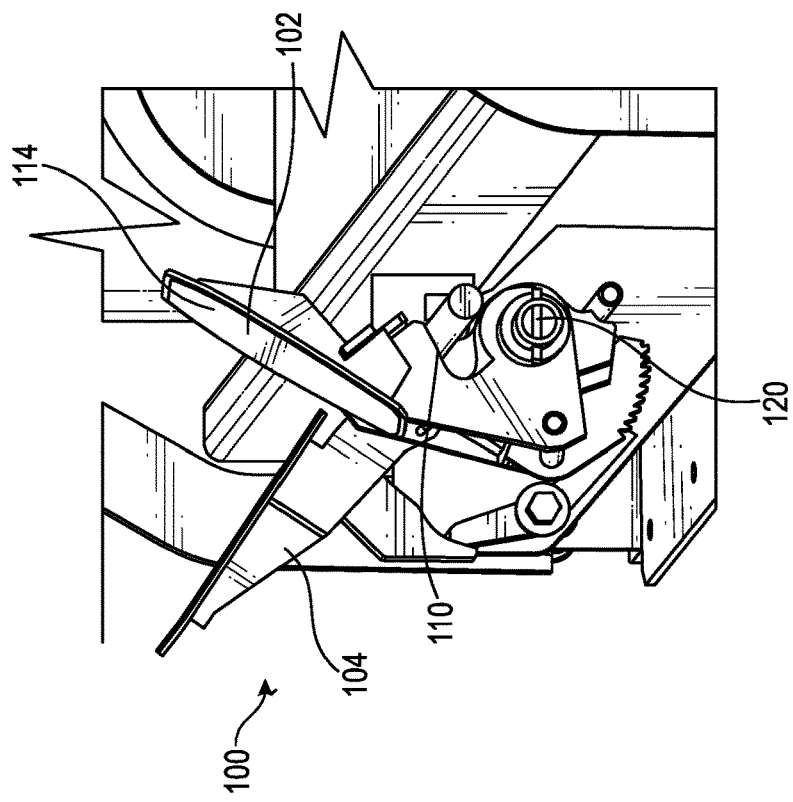
FIG. 18 is a top perspective view of the locking system of FIG. 13.

To lock the locking system 100 onto the tank lid 48*a*, the tank lid 48*a* is closed onto the tank opening 42*a* such as illustrated in FIGS. 3 and 17. The first foot pedal 102 and the second foot pedal 104 are in the home position as illustrated in FIG. 17. The home position is defined as the tank lid 48*a* resting on the tank opening flanges 58*a-d*, and the first and second foot pedals 102 and 104 in an upright position. To lock the tank lid 48*a* onto the tank opening 42*a*, an operator engages the foot engagement portion 114 of the first foot pedal 102 and presses the foot engagement portion 114 downward so that the foot engagement portion 114 rotates clockwise about the rotation axis or pivot 120 until the cam shape latch 110 engages the bar 80 to lock the tank lid 48*a* in a closed position as illustrated in FIGS. 18 and 19. In one form, the first foot pedal 102 rotates from an angle of about 64 degrees to an angle of about 28 degrees for a net angle movement of 36 degrees.

Figure 14:
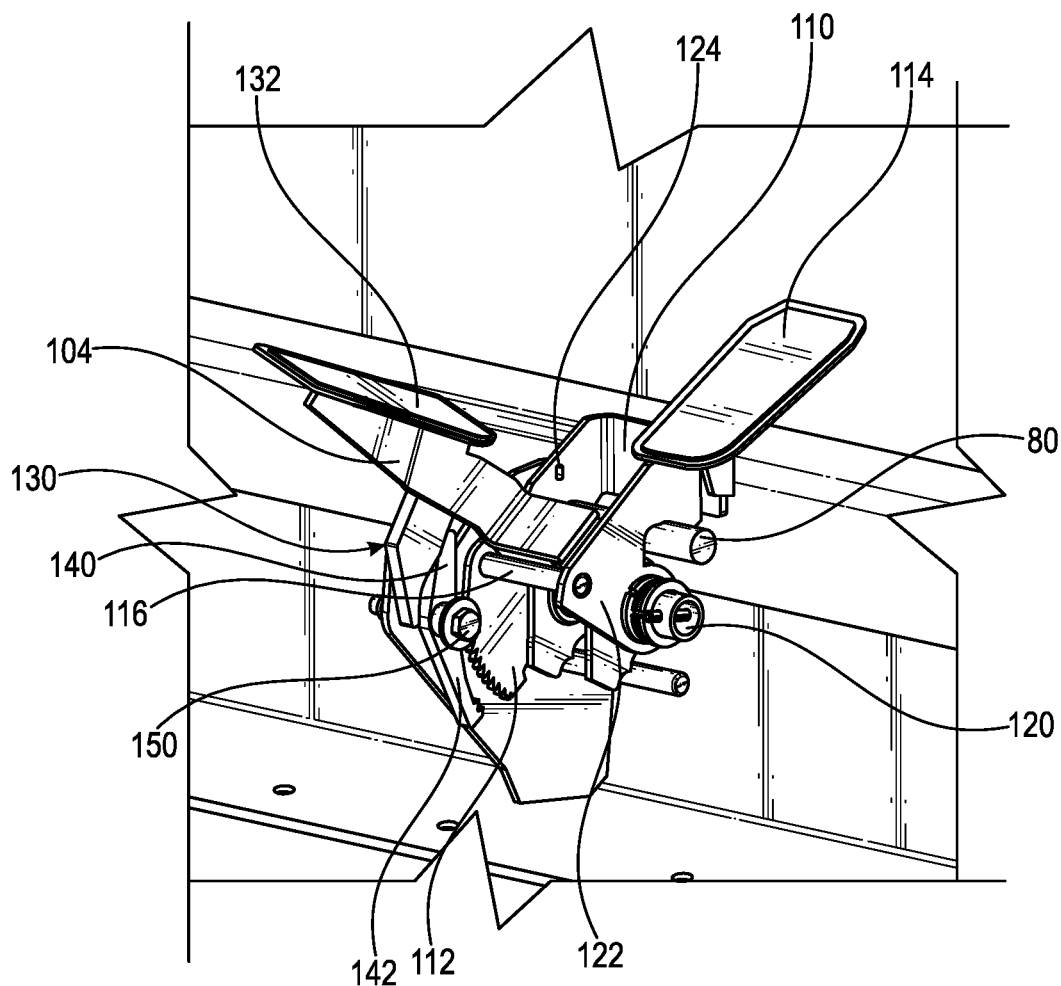
FIG. 14 is a top perspective view of the locking system of FIG. 13.

In FIG. 14, the operator engages the foot engagement portion 132 of the second foot pedal 104 to cause the second foot pedal 104 to rotate counterclockwise about the rotation axis or pivot 120 such that the engagement portion 130 engages the release portion 140 of the locking pawl 106 and causes the locking pawl 106 to rotate about the rotational axis 144 and bolt or other fastener 150 in a clockwise direction to release the locking pawl 106 from the engagement portion 112 of the first foot pedal 102. In one form, the second foot pedal 104 rotates from an angle of about 106 degrees to an angle of about 70 degrees for a net angle movement of 36 degrees.

Figure 15:
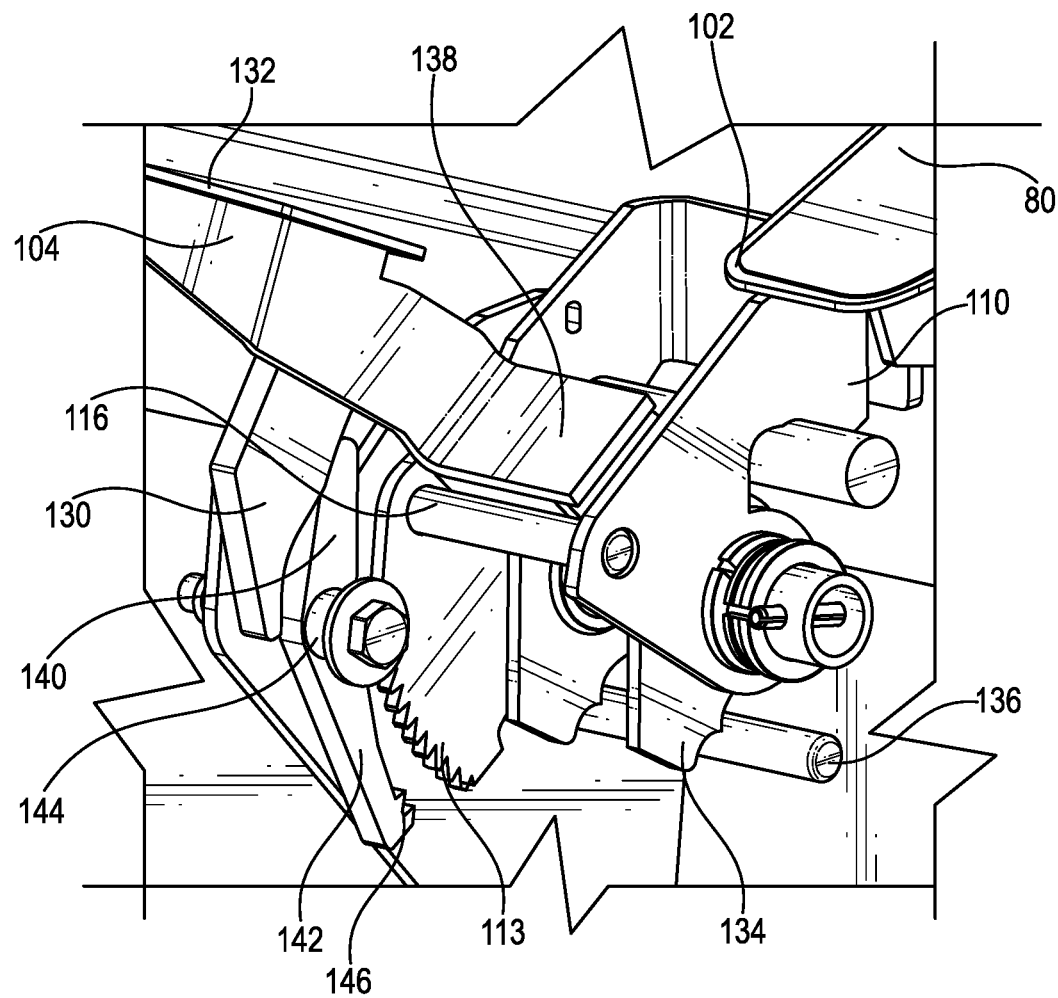
FIG. 15 is a top perspective view of the locking system of FIG. 13.
Figure 16:
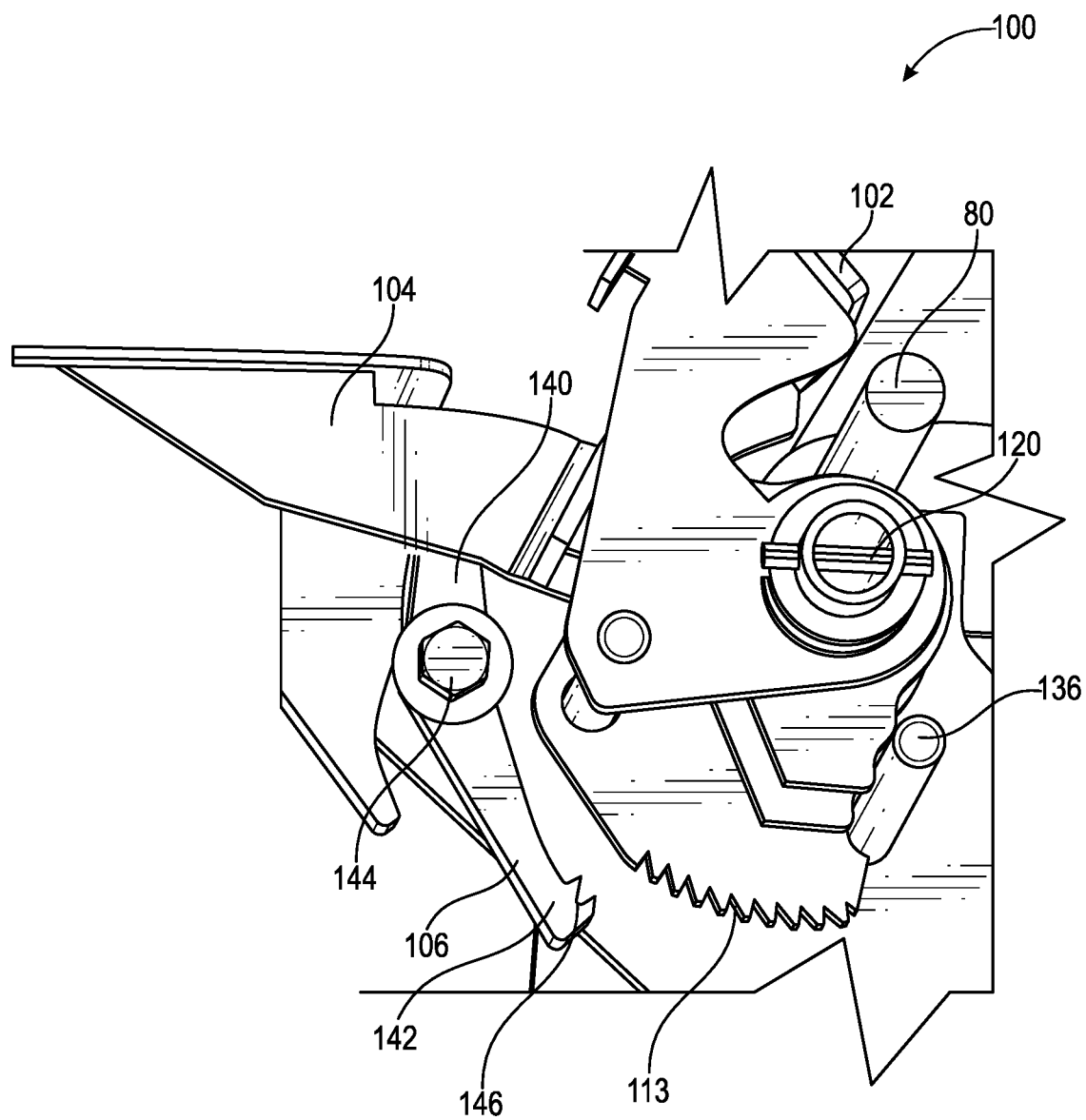
FIG. 16 is a top perspective view of the locking system of FIG. 13.

In FIG. 15, the operator continues to press on the foot engagement portion 132 of the second foot pedal 104 to cause the second foot pedal 104 to rotate counterclockwise about the rotation axis or pivot 120 such that the kicker portion 138 engages the bump stop 116 of the first foot pedal 102 to cause the first foot pedal 102 to rotate about the rotation axis or pivot 120 until the cam shape latch 110 disengages or releases from the bar 80. The first foot pedal 102 returns to the home position and the tank lid 48*a* is unlocked from the tank opening 42*a*.

To open the tank lid 48*a*, the handle 56*a* is engaged such that the operator presses down on the handle 56*a* and the pair of front linkages 57*a* as the front rollers 90*a-b* and the rear rollers 92*a-b* travel along the track openings 302*a-b* of the pair of guides 300*a-b* as described above. The handle 56*a* is operable between a closed position and an open position to lift the tank lid 48*a* and move the tank lid 48*a* along the pair of guides 300*a-b* to a fully open position. The operations are reversed to lift the tank lid 48*a* from the open position to the fully closed position and lock the locking system 100.

Beneficially, the locking system 100 uses fewer parts at least in part because of the single latching operation of the locking system 100. Beneficially, the rear pivot, i.e., the clevis pin 202 in the clevis opening 61 assists to keep the tank lid 48*a* clamped under the air pressure within the supply tank 40.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

The invention claimed is:

1. In an agricultural machine having a supply tank with a tank opening, a closure assembly comprising:
a tank opening flange configured to surround the tank opening;
a tank lid operable between an open position and a closed position, the tank lid while in the closed position configured to cover the tank opening, the tank lid while in the open position configured to uncover the tank opening, the tank lid having a first lid flange opposite a second lid flange;
a clevis mechanism operably attached to both of the second lid flange and the tank opening flange to enable the tank lid to pivot about the tank opening flange, wherein the clevis mechanism includes a clevis pin operably engaged with a clevis opening in the tank opening flange such that the clevis pin rotates in the clevis opening, further wherein the clevis opening is configured such that the clevis pin exits the clevis opening when the tank lid is in the open position;
a plurality of sliding mechanisms attached to the tank lid; and
a pair of guides attached to opposite sides of the tank opening flange, each of the pair of guides defines a track opening for receiving the plurality of sliding mechanisms such that the tank lid slides along the track openings of the pair of guides when the tank lid is operated between the open and closed positions.

2. The closure assembly of claim 1, further comprising:
one or more compression seals attached to an underside of the tank lid, the one or more compression seals disposed between the tank opening flange and the tank lid when the tank lid is in the closed position.

3. The closure assembly of claim 1, further comprising:
a locking system configured to retain the tank lid in a locked position.

4. The closure assembly of claim 3, wherein the locking system is configured to operably engage and lift the tank lid away from the tank opening.

5. The closure assembly of claim 1, wherein the track opening for each of the guides includes an arc portion, a climax portion, and a runner portion, wherein the climax portion operably connects the arc portion to the runner portion, further wherein the climax portion corresponds to the tank lid being in a raised position and the clevis pin released from the clevis opening.

6. The closure assembly of claim 5, wherein the runner portion has a length that corresponds to a length of the tank opening flange.

7. The closure assembly of claim 5, wherein the arc portion has a length that corresponds to the tank lid being in a raised position.

8. In an agricultural machine having a supply tank with a tank opening, a closure assembly comprising:
a tank opening flange configured to surround the tank opening;
a tank lid operable between an open position and a closed position, the tank lid while in the closed position configured to cover the tank opening, the tank lid while in the open position configured to expose the tank opening;
a pivotable mechanism operably attached to both of the tank lid and the tank opening flange to enable the tank lid to pivot about the tank opening flange, wherein the pivotable mechanism includes a clevis pin operably engaged with a clevis opening in the tank opening flange such that the clevis pin rotates in the clevis opening;
a plurality of sliding mechanisms attached to the tank lid; and
a pair of guides attached to opposite sides of the tank opening flange, each of the pair of guides defines a track opening configured to receive the plurality of sliding mechanisms such that the tank lid slides along the track openings of the pair of guides when the tank lid is operated between the open and closed positions and the clevis pin is released from the clevis opening as the plurality of sliding mechanisms move along the track openings.

9. The closure assembly of claim 8, further comprising:
one or more compression seals attached to an underside of the tank lid, the one or more compression seals disposed between the tank opening flange and the tank lid when the tank lid is in the closed position.

10. The closure assembly of claim 8, wherein the sliding mechanisms include rollers that move along the track openings to a climax portion of the track openings such that the tank lid is in a raised position and the clevis pin is released from the clevis opening.

11. The closure assembly of claim 10, wherein at least one of the rollers in the climax portion of the track opening includes at least one of the compression seals having cleared the tank opening flange.

12. The closure assembly of claim 10, wherein the sliding mechanisms include rollers that move along the track openings to an end opening such that the tank lid is lower than a top of the tank opening flange and the tank opening is uncovered when the tank lid is in the open position.

13. The closure assembly of claim 8, further comprising:
a locking system configured to retain the tank lid in a locked position.

14. The closure assembly of claim 8, wherein the clevis opening includes a semi-circular portion that extends to a clevis ramp configured to receive the clevis pin.

15. The closure assembly of claim 14, wherein the clevis ramp includes a lip upon which the clevis pin engages when the tank lid is moved from the open position to the closed position.

16. In an agricultural machine having a supply tank with a tank opening, a closure assembly comprising:
a tank opening flange configured to surround the tank opening;
a tank lid operable between an open position and a closed position, the tank lid while in the closed position configured to cover the tank opening, the tank lid while in the open position configured to uncover the tank opening;
one or more compression seals attached to an underside of the tank lid, the one or more compression seals disposed between the tank opening flange and the tank lid when the tank lid is in the closed position;
a plurality of sliding mechanisms attached to the tank lid;
a pair of guides attached to opposite sides of the tank opening flange, each of the pair of guides defines a track opening configured to receive the plurality of sliding mechanisms, the track opening configured to guide the plurality of sliding mechanisms and the tank lid around the tank opening flange; and
a pivotable mechanism operably attached to both of the tank lid and the tank opening flange to enable the tank lid to pivot about the tank opening flange, wherein the pivotable mechanism includes a clevis pin operably engaged with a clevis opening in the tank opening flange such that the clevis pin rotates in the clevis opening;

wherein the sliding mechanisms are configured to move along the track openings to a climax portion of the track openings such that the tank lid is in a raised position and the clevis pin is released from the clevis opening.

17. The closure assembly of claim 16, wherein the sliding mechanisms include rollers.

18. The closure assembly of claim 16, wherein at least one of the rollers in the climax portion of the track opening includes at least one of the compression seals having cleared the tank opening flange.

19. The closure assembly of claim 16, wherein the sliding mechanisms include rollers that move along the track openings to an end opening such that the tank lid is lower than a top of the tank opening flange and the tank opening is uncovered when the tank lid is in the open position.

20. The closure assembly of claim 16, further comprising:
a locking system configured to retain the tank lid in a locked position, the locking system is configured to operably engage and lift the tank lid away from the tank opening.

* * * * *